Sept. 6, 1932.　　　J. A. STADTFELD　　　1,876,357
　　　　　　　　　　GAS FLUE OR VENT
　　　　　　　　　Filed Aug. 8, 1928
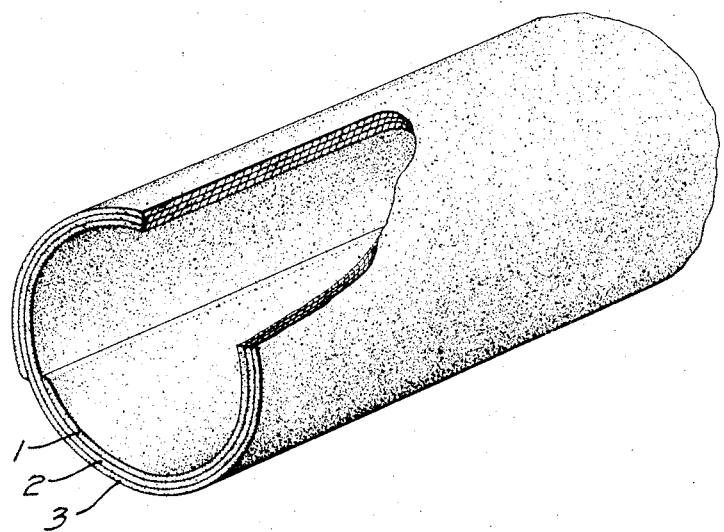
INVENTOR
Jacob A. Stadtfeld
BY
White, Prost & Fryer
ATTORNEYS Patented Sept. 6, 1932

1,876,357

UNITED STATES PATENT OFFICE

JACOB A. STADTFELD, OF SAN FRANCISCO, CALIFORNIA, ASSIGNOR TO PLANT RUBBER & ASBESTOS WORKS, INC., OF SAN FRANCISCO, CALIFORNIA, A CORPORATION OF CALIFORNIA

GAS FLUE OR VENT

Application filed August 8, 1928. Serial No. 298,224.

My invention relates to flues and vents used in carrying off the products of combustion arising from furnaces, heaters, ovens, smelters, and other appliances using petroleum or hydro-carbon fuel.

Pipes for this purpose have heretofore been made of such materials as galvanized iron, copper and terra cotta. Metallic pipes most commonly used are very good heat conductors and furthermore react readily with dilute acids. Because of these properties they cannot be effectively used as flues or vents for when so used water vapor, which is usually present in the products of combustion, is quickly condensed on their inner walls and the water vapor so condensed then reacts with sulphur content present in the products of combustion to form sulphurous acid. The acid so formed eats away the interior of the pipe. Not only is the life of the pipe decreased, but the pin holes first formed by corrosion are decidedly objectionable inasmuch as they permit the poisonous gases carried by the pipes to escape into the furnace rooms and basements of the buildings so equipped. Furthermore, the high heat conductivity of metallic pipes cools the gases conveyed therein so rapidly that their rate of travel is materially diminished thereby causing them to act as a stopper for the column of gases beneath them. This stopper effect creates a back draft forcing the products of combustion thru the above mentioned pin holes and thru the air reigsters of the furnaces. Lead and Monel-metal pipes are prohibitive because of their cost and do not prevent the condensation nor the consequent stopper action due to the too rapid cooling of the gases. The objectionable physical characteristics of metallic pipes when used for this purpose are therefore two-fold, their high conductivity and their non-resistance to the action of sulphurous and other acids. Because of these objections some city ordinances now require the installation of terra cotta or other cement flues and vents.

Terra cotta and cement tile flues are fairly good insulators when dry, but readily absorb moisture and thereby become fairly good conductors. On becoming saturated with moisture there is a consequent formation of dilute sulphurous acid which in the case of cement pipe soon breaks down the flue. Once having become good insulators the same stopper action takes place within them as with the metallic flues. Another objection to these flues is that since the various sections are joined by cement and since it is practically impossible to use a cement which has a coefficient of expansion equal to that of the flue, a tight joint cannot be maintained. Furthermore the weight of these pipes increases transportation costs.

In general, it is the object of this invention to provide a light, durable heat-insulating, acid-resistant flue.

More specifically, the object of my invention is the provision of a laminated asbestos flue which has been impregnated with a mixture of sodium silicate, zinc oxide, lead carbonate, silica and calcium chloride, and then subjected to the action of heat.

Another object of my invention is the provision of a process by which a laminated, acid-resistant asbestos pipe may be conveniently made.

The invention possesses other advantageous features, some of which with the foregoing will be set forth at length in the following description where I shall outline in full that form of my invention which I have selected for illustration in the drawing accompanying and forming part of the present specification. In said drawing I have shown one form of my invention, but it is to be understood that I do not limit myself to such form, since the invention as set forth in the claims, may be embodied in a plurality of forms.

Referring to the drawing:

The single figure is a perspective view of a laminated asbestos pipe, partly broken away to show its construction and composition and formed in accordance with my invention.

The finished product of my invention consists of a laminated, acid-resistant asbestos flue, impregnated with a solidifying and heat-resisting binder. In the drawing, this pipe has been shown as consisting of a plurality of laminations, 1, 2 and 3, which are impregnated with the solidifying heat and acid-resisting binder as shown by the stippling.

The method used in preparing a flue having the above described characteristics consists first, in impregnating a strip of fabricated material such as asbestos paper or felting with a mixture of silica, zinc oxide, lead carbonate and sodium silicate; in winding the fabricated material so impregnated about a mandrel to form a cylinder; in air drying this cylinder for twenty-four hours and then in baking it at a temperature of 800° F., in passing or dipping the baked cylinder thru a bath of the original mixture used, thinned with three gallons of sodium silicate; in air drying the cylinder so dipped for one hour; in then passing the cylinder thru a bath of a saturated solution of calcium chloride; and finally in baking for three hours at a temperature of 400° F. to form a solid and heat resistant coating on the impregnated cylinder.

The impregnating mixture or cement used is preferably made by mixing the following ingredients in substantially the proportions stated:

7 gallons of 142 Baumé sodium silicate
7½ lbs. of zinc oxide—(preferably carrying 2 to 5% of lead sulphate)
½ lb. of lead carbonate
50 lbs. of silica The asbestos strips are straight-wound on the mandrels and their impregnation may be assisted by passing them between a pair of rotating wringer rollers, one of which is partially immersed in a bath of the cement or binder above described.

The baking process apparently produces a chemical reaction between the ingredients used, for the final product is a light, rigid, solid, substantially insoluble and acid-resistant heat insulating cylinder.

For joining sections of these cylinders a short sleeve of the same material is telescoped over their abutting ends and cemented thereto with a cement having substantially the same composition as the impregnating cement used in their manufacture. For all practical purposes such a cement solidifies sufficiently on air drying to make a solid joint having a coefficient of expansion equal to that of the flue itself.

Since these cylinders are good heat insulators, flues constructed therefrom convey away the products of combustion without allowing them to cool sufficiently to cause a consequent condensation of their water vapor content. At least such condensation is materially diminished.

As a direct result of this, as above explained, the "stopper" action or back draft caused by flues made of good conductors is also reduced, thereby maintaining the furnace room or basement free from obnoxious gases.

What little acid is formed by the reaction between the sulphur content in the products of combustion and any water vapor which may possibly condense on the walls of the flue, can do not harm, for as above stated, the flues are by their very nature resistant to dilute acids.

These flues are readily cut by an ordinary crosscut saw and being materially lighter than either metallic or terra cotta pipes their cost of transportation is proportionately lower.

I claim:

1. The process of making a heat insulating acid resistant pipe consisting in impregnating a strip of asbestos with a mixture of sodium silicate, zinc oxide, lead carbonate and silica; in winding the material so impregnated about a mandrel to form a cylinder; in air drying and baking the cylinder so formed; in passing this cylinder thru a bath of calcium chloride and in then baking the cylinder so treated.

2. The steps in the method of making a heat insulating and acid resistant pipe for carrying off products of combustion, which comprise impregnating fibrous sheet material with an alkali metal silicate and a metal compound, forming the sheet into a tube, heating the tube to form a solid and heat resistant binder of the impregnating material, treating the tube with an alkali metal silicate and a substance which will react therewith to form an insoluble silicate, and heating the tube thus treated to form a heat resistant coating thereon.

In testimony whereof, I have hereunto set my hand.

JACOB A. STADTFELD.